United States Patent [19]

Blum et al.

[11] 4,186,049

[45] Jan. 29, 1980

[54] HEAT EXCHANGER INTEGRATED INTO THE MAIN VESSEL OF A MOLTEN COMBUSTIBLE SALT REACTOR

[75] Inventors: Jacques M. Blum, Levallois-Perret; Edmond Ventre, Le Vesinet, both of France

[73] Assignee: Electricite de France (Service Nationl) & Pechiney Ugine-Kuhlman, France

[21] Appl. No.: 815,773

[22] Filed: Jul. 14, 1977

[30] Foreign Application Priority Data

Jul. 22, 1976 [FR] France .................. 76 22394

[51] Int. Cl.² .................. G21C 3/54; G21C 15/00
[52] U.S. Cl. .................. 176/38; 176/49; 176/65
[58] Field of Search .................. 176/38, 40, 49, 65, 176/50

[56] References Cited

U.S. PATENT DOCUMENTS

| | | | |
|---|---|---|---|
| 3,230,146 | 1/1966 | Astley et al. | 176/40 |
| 3,379,616 | 4/1968 | Vitry | 176/65 |
| 3,498,880 | 3/1970 | Gollion | 176/65 |
| 3,715,270 | 2/1973 | Jackson | 176/38 |
| 3,892,625 | 7/1975 | Patterson | 176/50 |
| 3,962,032 | 6/1976 | Berniolles et al. | 176/65 |
| 4,032,399 | 6/1977 | Defauchy et al. | 176/40 |
| 4,045,286 | 8/1977 | Blum et al. | 176/49 |

Primary Examiner—Harvey E. Behrend
Attorney, Agent, or Firm—Cameron, Kerkam, Sutton, Stowell & Stowell

[57] ABSTRACT

Heat exchanger integrated into the main vessel of a molten combustible salt reactor comprising a reactor skirt containing the active core, a main vessel surrounding the reactor skirt, pumps and primary exchangers, an outer vessel which doubles the main vessel, a thermostatic coolant between the main and outer vessels maintaining the main vessel wall at a temperature below the melting temperature of a crust of salt which is inactive from a nuclear standpoint and which forms a coating of solid salt protecting the inner surface of said main vessel, wherein the calories are extracted from the core by means of autonomous heat transfer modules each comprising a primary exchanger and a pump, whereby each module is suspended in the intermediate space between the main vessel and the reactor skirt and supported by a bearing surface whose base is located on a cooperating bearing surface provided around an opening made in the wall of a supporting ferrule fixed close to the bottom of the reactor skirt and over the entire circumference of the latter, said ferrule extending from the skirt to the vicinity of the main vessel in the solid protective salt crust.

6 Claims, 4 Drawing Figures

HEAT EXCHANGER INTEGRATED INTO THE MAIN VESSEL OF A MOLTEN COMBUSTIBLE SALT REACTOR

BACKGROUND OF THE INVENTION

The present invention relates to nuclear reactors of the molten combustible salt type, and more specifically of the type having a primary integrated circuit. In such reactors the core and its reflector are located in a first vessel called the "reactor skirt" which is itself contained in its tower with pumps and primary exchangers in a second vessel called the main vessel.

These reactors use a liquid fuel heated to a high temperature of at least about 600° C. by nuclear fission in the core, whereby said fuel is generally constituted by uranium or plutonium fluoride or a mixture of uranium fluoride and thorium dissolved in lithium fluorides and beryllium so that the mixture has a relatively low melting point, a suitable fluidity and a low vapour tension. When neutrons have to be thermalised the core of such reactors contains a suitable moderator mass such as graphite, whereby there are discharge channels for the combustible salt which then exchanges the calories obtained on passing through the core in a primary heat exchanger with another molten salt called the buffer salt, for example sodium fluoborate. In turn this buffer salt exchanges its calories in a secondary circuit comprising a steam generator, the steam being finally expanded in an electricity production plant.

In such integrated reactors the molten combustible salt is contained in a metal vessel called the main vessel whose walls are protected against chemical corrosion and high temperatures by carbonaceous materials. For example, this is the case with the nuclear reactor forming the object of French Patent Application EN 7442767 of 24.12.1974 entitled "Molten combustible salt nuclear reactor". In said reactor the main vessel is almost entirely filled with said carbonaceous materials and the only cavities provided in said carbonaceous material mass are those containing the reactor core, the heat exchangers, the circulating pumps for the molten salt and the different galleries ensuring the hydraulic connection between the components specified hereinbefore.

In theory, this design of the integrated primary circuit in a main metal vessel permits the insulation of said confining structure relative to the molten combustible salt contained therein.

Unfortunately, experience has shown that although interesting in theory these constructions give rise in practice to a certain number of shortcomings due in particular to the great difference existing between the thermal expansion coefficients of the vessel material on the one hand and the carbonaceous filling material on the other. As a result, it is necessary to provide a better protection of the main vessel relative to the molten salts. A device for protecting a main vessel of this type forms the object of French Patent Application EN 7517939 filed on June 9, 1975 entitled "Process and apparatus for protecting the vessel of a molten salt nuclear reactor".

A per se known device of this type will be described in greater detail with reference to FIG. 1.

FIG. 1 shows in the form of an axial half-section a molten salt reactor having an integrated primary circuit designated by the general reference numeral 1. In a protective concrete enclosure 2 said reactor comprises a main vessel 3 containing the reactor core 4 itself located in the reactor skirt 5 and the exchangers and circulating pumps for the molten salt, whereby the location of the single exchanger 6 is clearly visible in FIG. 1. The inner wall of said main vessel 3 as well as its internal volume not occupied by the reactor elements are lined with a per se known carbonaceous filling material designated by 7 in FIG. 1.

In this construction a second outer vessel 8 is placed around the main vessel 3, whereby the space between vessels 3 and 8 is filled with a climatisation or air-conditioning fluid 9. The temperature of this fluid is controlled, for example by at least one submerged circulating fluid exchanger 10, the water entering at 11 and leaving in the form of steam at 12.

Firstly, the main vessel is heated to a temperature of, for example, 400° C. by acting on the air-conditioning fluid 9 and exchangers 10 leading to the formation of an empty space 13 as a result of the differential expansion occurring between carbon 7 and the steel of vessel 3. Vessel 3 is then first filled with an auxiliary salt which contains no fissile or fertile material and whose melting point is below the temperature to which vessel 3 has been heated, i.e. 400° C. in the case described herein. This salt can be of different types and advantageously it is constituted by the eutectic of lithium fluorides and beryllium whose melting point is 350° C. It is absolutely necessary for it to be chemically compatible with the actual combustible salt. This auxiliary salt which is neutral from a nuclear standpoint fills the said empty space 13 and the interstices located in the carbonaceous lining mass 7.

In a second phase which follows the first the temperature of the main vessel 3 is lowered to below the melting point of the auxiliary salt used by means of the air-conditioning fluid 9 and the exchangers 10 which causes the agglomeration or solidification of that part thereof which has filled space 13 created between the main vessel 3 and the carbonaceous filling material mass 7 and to a certain depth the interstices emerging at the periphery of the carbonaceous mass 7. In the present example where the eutectic of lithium fluorides and beryllium has a melting point of 350° C. the air-conditioning temperature of fluid 9 is, for example, lowered to 300° C.

When all the auxiliary salt in space 13 has solidified and this solidification has also penetrated a certain depth into the interstices emerging in said area 13, the reactor is loaded with the final combustible salt.

At the end of these operations vessel 3 is definitively maintained at 300° C. and the reactor is ready for operation. The crust of auxiliary salt in the space 13 between vessel 3 and the carbonaceous filling mass 7 substantially has no contact with the combustible salt. Thus, there is no need to fear a nuclear reaction in said crust of neutral salt which is thus maintained at an essentially constant temperature and can effectively fulfil its function of providing corrosion protection for the main vessel 3.

The present invention applies to the molten salt reactor of the type described with reference to FIG. 1 and the invention in fact aims at improving the heat exchangers of reactors of this type.

In such reactors the primary heat exchange system has hitherto been constituted by an integrated system in the main vessel and has comprised the arrangement in alternate manner of an exchanger and a pump in the carbonaceous filling material, whereby said components are distributed over the entire periphery of the structure. In the known constructions, the pumps circulate the molten salt in the reactor skirt from bottom to top and the hot salt descends in countercurrent flow by forced circulation in the adjacent exchangers which it thus traverses from top to bottom. A transverse hydraulic connection is then necessary between the base of each primary exchanger and the adjacent pump shafts in order to ensure the return of the cold salt to the reactor core resulting in significant expansion problems in operation.

BRIEF SUMMARY OF THE INVENTION

The present invention relates more particularly to a heat exchanger integrated into the main vessel of a nuclear reactor of the molten combustible salt type which obviates this serious disadvantage in a simple and effective manner.

This heat exchanger integrated into the main vessel of a molten combustible salt reactor comprises a reactor skirt containing the active core, a main vessel surrounding the reactor skirt, pumps and primary exchangers, an outer vessel which doubles the main vessel, a thermostatic coolant between the main and outer vessels maintaining the main vessel wall at a temperature below the melting temperature of a crust of salt which is inactive from a nuclear standpoint and which forms a coating of solid salt protecting the inner surface of said main vessel, wherein the calories are extracted from the core by means of autonomous heat transfer modules each comprising a primary exchanger and a pump, whereby each module is suspended in the intermediate space between the main vessel and the reactor skirt and supported by a bearing surface whose base is located on a cooperating bearing surface provided around an opening made in the wall of a supporting ferrule fixed close to the bottom of the reactor skirt and over the entire circumference of the latter, said ferrule extending from the skirt to the vicinity of the main vessel in the solid protective salt crust.

According to a preferred embodiment of the invention, the bearing surface of the module has a spherical profile and cooperates with a planar supporting surface.

According to a special feature of the invention, each autonomous module is suspended elastically on a structure which is generally made from concrete and forming the upper slab of the reactor in such a way as to permit a limited angular displacement of the assembly comprising an exchanger, a pump and optionally a flow regulating valve.

According to another feature of the invention, the supporting ferrule has a conical surface fixed by one side to the reactor skirt and whose opposite end towards the main vessel is left free. On the reactor core periphery, said ferrule has openings which cooperate with the lower part of each autonomous module and permit the forcing back of the cold salt within the reactor skirt. Moreover, the periphery of each of these openings has a planar bearing surface cooperating with the homologous spherical bearing surface of each autonomous module which ensures both the support and sealing at the contact area between said module and said ferrule.

On the basis of the above features, two special embodiments can be envisaged.

According to a first embodiment, each opening made in the wall of the ferrule sealingly cooperates with the lower part of the core by means of a delivery pipe which serves to pipe the cold salt from the pump to the base of the reactor, the end of the ferrule being free in the inner area of the main vessel in the solid protective salt zone.

In a construction of this type a delivery pipe serves to pipe the cold salt from the base of each autonomous module to a return opening in the reactor skirt, whereby said delivery pipe is tightly sealed. The lower part of the main vessel of the reactor cannot therefore be subject to the delivery pressure of the cold salt. As a result, the sealing between the main vessel and the ferrule is unnecessary at the inner periphery of the latter. This variant is of interest for the latter reason and due to the fact that the delivery pipe is in principle made from the same material as the vessels and ferrule and is at the same temperature so that there is no longer any danger from the thermal stresses occurring in the prior art devices where a transverse hydraulic pipe was necessary for ensuring the delivery of the cold salt from the base of each exchanger to the base of each pump. However, differential expansion problems may possibly occur during accidental transient operating cycles in which the various elements constituting the ferrule and delivery pipe may not have the same thermal response time and may consequently be heated to different temperatures.

This disadvantage is completely eliminated with a second embodiment of the invention in which each opening in the ferrule wall communicates directly with the space in the lower area between the main vessel and the reactor skirt, whereby the base of the latter has direct passages for the return of the cold salt into the reactor core. On the side of the main vessel this space is sealed by the solid salt crust in which is arranged the free end of the conical ferrule. The essential advantage of said second variant is that the solid salt crust which is hypothetically provided along the inner wall of the main vessel results in an adequate sealing between the free floating end of the ferrule and the main vessel. This sealing can be made even more reliable in accordance with a special arrangement provided by the invention whereby the tapered end of the ferrule cooperates with an annular boss on the main vessel, said ferrule engaging beneath said boss in the solid salt crust area. During operation this arrangement permits all relative radial and heightwise expansions between the end of the ferrule and the main vessel without there being any break in the sealing because the boss and the end of the ferrule are always contained in the zone filled by the internal crust of salt which is neutral from the nuclear standpoint.

According to this second embodiment of the invention, all the lower annular part between the reactor skirt, the main vessel and the ferrule is filled by cold salt delivered by the pumps of the autonomous heat transfer modules and consequently this space is subject to the pressure of said pumps which does not constitute a disadvantage. The return of the cold salt to the inside of the reactor skirt is ensured by openings made in the lower part of the reactor skirt beneath the ferrule.

Therefore, the most important feature of the heat exchanger according to the invention is that it permits by simple means the elimination of the thermal stresses occurring in the prior art as a result of the spatial division of the functions of the exchanges and the pumps whilst ensuring for each autonomous module a tightly sealed support which permits the displacements made necessary by the differential thermal expansion of each of said autonomous modules.

Moreover, as said tight support is provided by simple cooperation between a spherical bearing surface and a conical planar bearing surface, the fitting and/or removal of each autonomous module is made possible by a simple vertical translation without it being necessary to disassemble any member in the vicinity of the reactor core.

Figure 2:
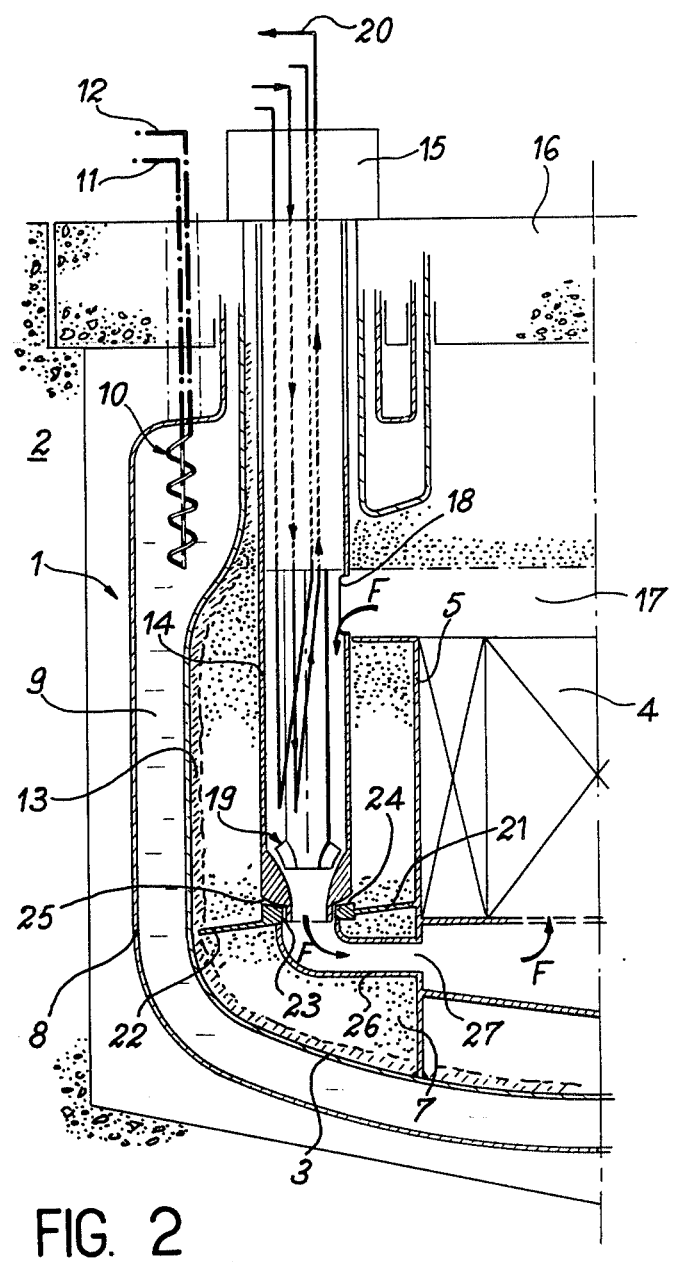
Figure 3:
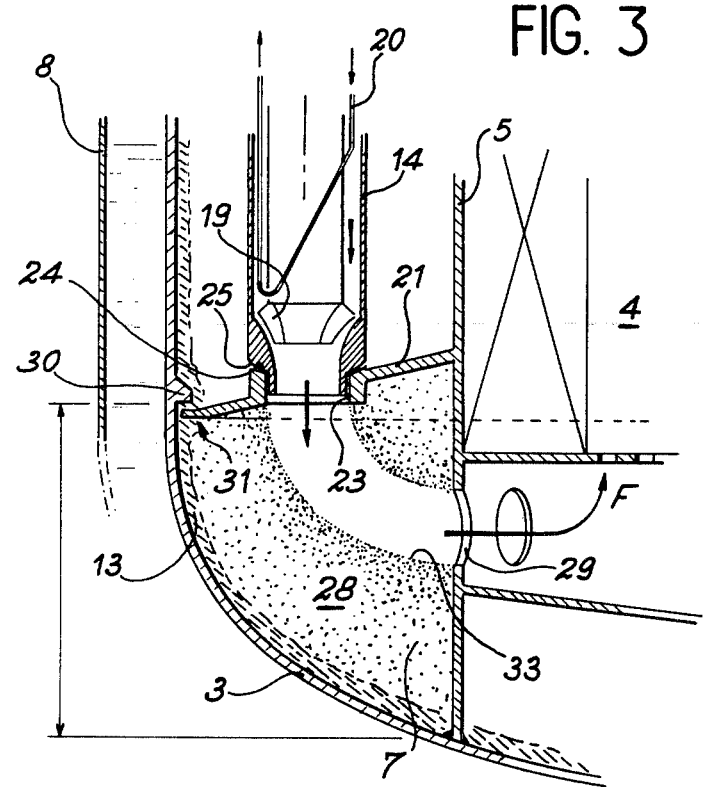
Figure 4:
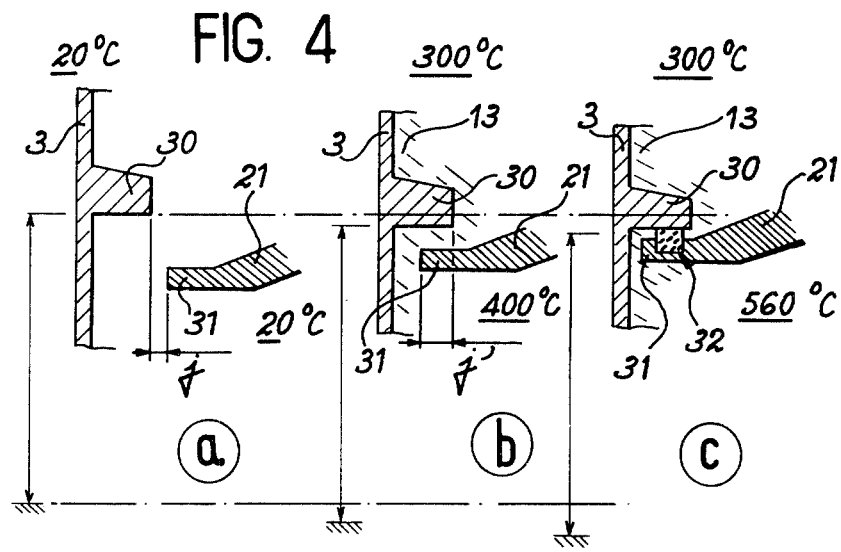

The invention will be explained hereinafter relative to two illustrative and non-limitative embodiments and with reference to FIGS. 2 to 4 which show:

FIG. 2, a schematic half-section along the axis of the reactor of a construction according to the first embodiment of the invention;

FIG. 3, a section along the axis of the reactor of the lower part of an autonomous heat transfer module in a construction according to a second embodiment of the invention;

FIG. 4 in three successive positions as a function of the temperature rise of the reactor, the end of the ferrule with three diagrams 4a, 4b and 4c.

DETAILED DESCRIPTION OF THE PREFERRED EMBODIMENTS

Figure 1:
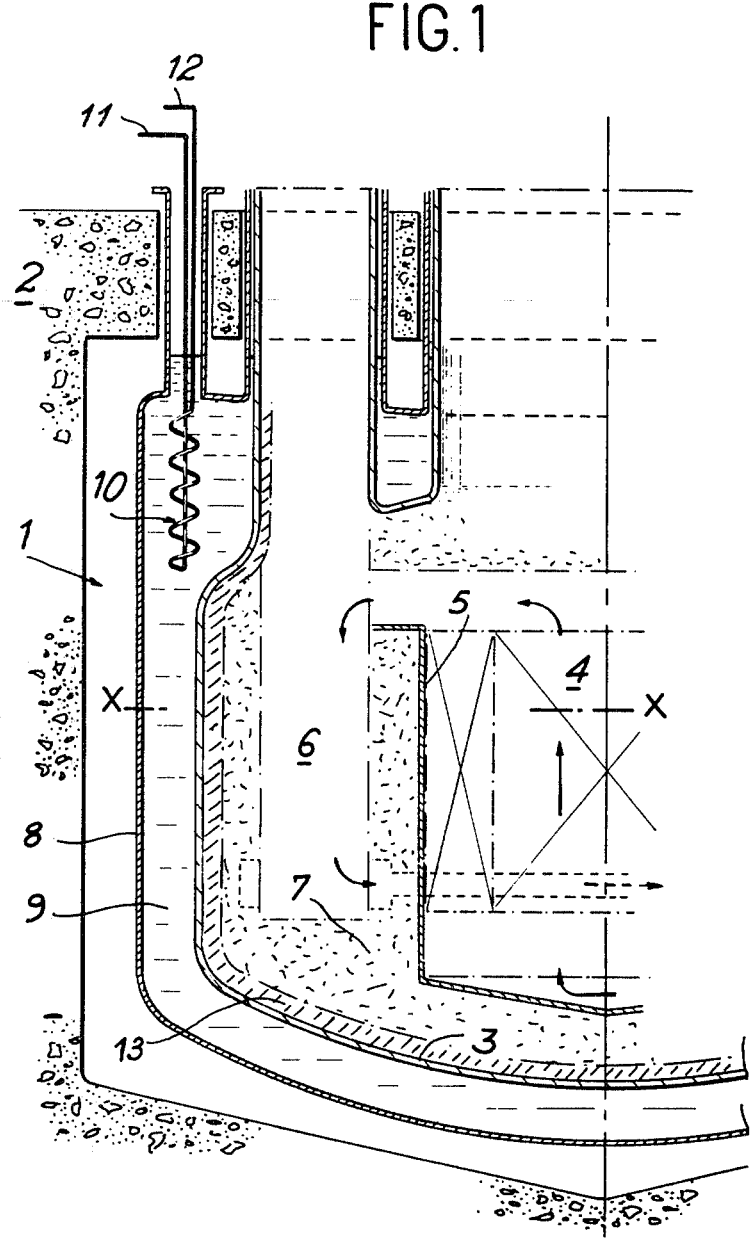
FIG. 1 shows known structure for protecting the vessel of a molten salt nuclear reactor.

The prior art components which have already been described with reference to FIG. 1 will not be described relative to FIG. 2 and in addition the same reference numerals will be used. FIG. 2 shows in a more explicit manner an autonomous heat transfer module 14 suspended on the upper slab 16 of the reactor by elastic means 15 which permit a limited angular displacement of the assembly about its vertical axis. Autonomous module 14 comprises a primary circuit 17, designated by arrows F for the circulation of the combustible salt which when heated on leaving core 4 penetrates the module via an opening 18 provided in the upper part thereof and then after cooling is forced back by a pump 19 located in the lower part thereof. A secondary salt circuit whose inlets and outlets are designated by reference numeral 20 receives the calories from the combustible salt in the primary circuit and finally transfers them to a not shown water circuit where the steam produced is finally used to operate an also not shown turbine.

The lower part of autonomous module 14 has, if necessary, a non-return valve for the molten salt flow, said valve not being shown in FIG. 2.

According to the invention, between reactor skirt 5 and main vessel 3 a conical ferrule 21 is provided which by one end is fixed to reactor skirt 5 and whose other end 22 is mounted freely in the immediate vicinity of main vessel 3 in the solidified salt layer 13.

According to the invention, the surface of conical ferrule 21 has openings 23 distributed around the core axis, each being surrounded by a planar bearing surface 24 and cooperating in the present embodiment with a spherical bearing surface 25 in the lower part of autonomous module 14. The bearing of spherical bearing surface 25 on planar bearing surface 24 makes it possible to support the weight of module 14, whilst ensuring the relative displacements of the said members relative to one another in accordance with the different thermal operating cycles of the reactor, whilst providing the sealing relative to the pressure of the cold salt delivered by pump 19 at the base of autonomous module 14. In the embodiment of FIG. 2 a delivery pipe 26 directly links the base of module 14 through opening 23 and the lower part of the reactor core via an opening 27 made in wall 5 of the reactor skirt below conical ferrule 21. Pipe 26 is made from the same material as the reactor skirt 5 and ferrule 21, said members being at the same temperature during normal operation of the reactor. This makes it possible to avoid all differential expansion problems encountered in prior art solutions using transverse connections between the base of each exchanger shaft and the base of each pump shaft, said two components being completely separate.

A second embodiment of the invention will now be described with reference to FIG. 3. In this embodiment each autonomous heat transfer module 14 provided with its pump 19 is supported, as in the previous embodiment, on a conical ferrule 21 having openings 23 for the passage of the cold salt delivered by the corresponding pump 19. As in the previous embodiment, the cooperation between a spherical bearing surface 25 at the base of module 14 and a planar bearing surface 24 surrounding opening 23 leads to a tightly sealed support and permits the relative movements of module 14 and ferrule 21.

In this embodiment the space below ferrule 21 between main vessel 3 and reactor skirt 5 is subject to the pressure of pump 19, whereby the cold salt flows through channels 33 made in carbonaceous mass 7 connecting the outlet of the pumps to openings 29 made in the lower part of skirt 5 to the reactor core and in accordance with arrow F. Channels 33 are obtained by an appropriate shaping of the carbonaceous material in the absence of any metallic element connecting the opening of the pumps to those of the reactor skirt. Thus, the mass of carbonaceous material ensures the filling of space 28, whilst piping the combustible salt between the pumps and openings 29. This space is not tightly sealed and construction joints can exist between the carbonaceous elements and there can be tolerances between said elements and the metallic structures defining space 28. Cracks may also occur in the carbonaceous mass. Therefore the delivery pressure of the pumps can be exerted on the periphery of this space which from then on should be sealed. With regard to vessel 23 and ferrule 21, this sealing is more particularly obtained by the cooperation of a boss 30 and the free end 31, which is preferably slightly tapered, of conical ferrule 21 which moves freely beneath boss 30, the assembly being located in area 13 which is filled by the neutral solid salt crust which is voluntarily maintained against the inner surface of main vessel 3. This arrangement which is essential for the second embodiment of the invention is described in greater detail with reference to FIG. 4.

FIG. 4a illustrates the reciprocal arrangement of boss 30 on main vessel 3 and the free end 31 of ferrule 21 when, with the reactor shut down, the different members are at the same ambient temperature, for example about 20° C. The external diameter of ferrule 21 is then below the inner bore of boss 30 providing a given clearance between said members permitting a one piece fitting of the ferrule during assembly.

In FIG. 4b the respective position of the different members corresponds to the formation stage of salt crust 13, i.e. when vessel 3 is heated to a temperature of about 300° C. whilst ferrule 21 is at a temperature of about 400° C. Under these conditions boss 30 connected to vessel 3, and on which it is suspended by its upper part, drops slightly relative to the position which it occupied in FIG. 4a, whilst conical ferrule 21 has expanded transversely towards the outside of the reactor by a distance sufficient to bring about a partial covering of said boss by said ferrule measured by the distance j'. Simultaneously, the upward vertical expansion of ferrule 21 causes the engagement of its end 31 beneath boss 30, approaching the latter in the area of solid salt 13.

In FIG. 4c which corresponds to the normal operation of the reactor, the main vessel 3 is still at a temperature of 300° C. necessary for maintaining the crust of solid salt 13 against its surface, whilst conical ferrule 21 has reached a temperature of about 560° C., its expansion in both the radial and vertical directions having increased further. Therefore its free end 31 engages beneath boss 30, permitting if necessary the fitting of a piece of graphite 32 located in a groove made in the upper part of end 31 so as to increase the sealing between the latter and boss 30.

It should also be noted that the cooperation between end 31 of ferrule 21 and boss 30 of main vessel 3 is beneficial from the thermal standpoint because the tapered portion constitutes a significant impedance for the calories which would otherwise tend to escape directly from the core towards the periphery. Moreover, boss 30 constitutes a mass whose thermal impedance is very low and via which it is possible to evacuate very rapidly the calories from conical ferrule 21 towards the air-conditioning fluid 9 contained between main vessel 3 and outer vessel 8. It is clear that the solidification of salt crust 13 takes place automatically even when occasional cracks occur in said crust, for example during the sliding of the two metal members 30 and 31.

In the extreme case where a break in the sealing could occur due to cracks in the crust 13 between boss 30 and end 31 as a result of said two members sliding, e.g. due to a change in the thermal operating cycle, combustible salt could possibly pass through the carbonaceous lining and flow between ferrule 21 and vessel 3. This mixture which would have to pass into the cold area adjacent to the main vessel 3 where the temperature is lower than its melting point would then be rapidly solidified again which would automatically re-establish the sealing. In other words, the device according to the invention permits a certain relative movement between the metal members as a result, for example, of a change in the thermal state of the ferrule, but the sealing is automatically restored by solidification of the liquid salt coming into contact with the cold metal parts.

The invention is not limited to the embodiments described and represented hereinbefore, and various modifications can be made thereto without passing beyond the scope of the invention.

What is claimed is:

1. A heat exchanger integrated into the main vessel of a molten combustible salt reactor comprising a reactor vessel containing the active core, a main vessel surrounding said reactor vessel, pumps and primary exchanges, an outer vessel spaced from said main vessel, a coolant between said main and said outer vessel maintaining said main vessel wall at a temperature below the melting temperature of a nuclearly inactive coating of solid salt on and protecting an inner surface of said main vessel, a plurality of autonomous heat transfer modules for removing heat from the core, each of said modules comprising a primary exchanger and a pump, each of said modules being suspended in the space between said main vessel and said reactor vessel, the improvement comprising a first bearing surface at the base of each of said modules, a horizontally extending plate secured around the lower end of said reactor vessel extending toward and spaced from said main vessel and ending in said coating of solid salt, an opening in said plate for each of said modules and a second bearing surface around each of said openings supporting the adjacent one of said first bearing surfaces.

2. A heat exchanger according to claim 1, wherein each of said opening sealingly cooperates with a lower part of said core by a delivery pipe for salt from the pump to the base of the reactor core.

3. A heat exchanger according to claim 1, wherein each of said openings communicates directly with a space in a lower part of said main vessel and beneath said reactor vessel, direct passages in said space for the return of the cold salt to the reactor core, the sealing of said space on the main vessel side being provided by said solid salt coating.

4. A heat exchanger according to claim 3, wherein a free end of said plate is tapered and underlies an annular boss on said main vessel within said solid salt coating.

5. A heat exchanger according to claim 4, wherein said free end of said plate supports on an upper face a graphite sealing element engaging a lower surface of said boss.

6. A heat exchanger according to claim 4 wherein said free end of said plate has on assembly and when cold an external diameter less than the internal diameter of said boss.

* * * * *